United States Patent [19]

Verbeke et al.

[11] Patent Number: 5,519,229
[45] Date of Patent: May 21, 1996

[54] CASSETTE FOR PSL RADIOGRAPHY

[75] Inventors: Gentil Verbeke; Gerard Boeve, both of Edegem, Belgium

[73] Assignee: Agfa-Gevaert N.V., Mortsel, Belgium

[21] Appl. No.: 417,267

[22] Filed: Apr. 5, 1995

Related U.S. Application Data

[63] Continuation of Ser. No. 39,993, Mar. 30, 1993, abandoned.

[30] Foreign Application Priority Data

Apr. 21, 1992 [EP]  European Pat. Off. ............ 92201109

[51] Int. Cl.⁶ ...................................................... G03B 42/04
[52] U.S. Cl. ...................................................... 250/484.4
[58] Field of Search .............................. 250/589, 484.4, 250/581, 589, 484.4, 554, 582; 378/182; 206/455

[56]  References Cited

U.S. PATENT DOCUMENTS

| | | | |
|---|---|---|---|
| 4,603,260 | 7/1986 | Takano | 250/484.4 |
| 4,660,722 | 4/1987 | Poehlor | 206/454 |
| 4,827,136 | 5/1989 | Bishop, Jr. et al. | 250/484.4 |
| 4,844,961 | 7/1989 | Akao | 206/455 |
| 4,870,285 | 9/1989 | Ohgoda | 378/182 X |
| 4,960,994 | 10/1990 | Müller et al. | 250/584 |
| 4,961,000 | 10/1990 | Finkenzeller et al. | 250/484.4 |
| 4,975,590 | 12/1990 | Tanaka | 250/484.4 |
| 4,984,688 | 1/1991 | Mikulin | 206/455 |
| 4,987,308 | 1/1991 | Tamura et al. | 378/187 |
| 5,065,866 | 11/1991 | Boutet et al. | 378/182 |
| 5,090,567 | 2/1992 | Boutet | 206/455 |
| 5,138,160 | 8/1992 | Shimizu et al. | 378/182 |
| 5,170,424 | 12/1992 | Bauer | 378/182 |
| 5,340,995 | 8/1994 | Verbeke et al. | 250/581 |

FOREIGN PATENT DOCUMENTS

| | | | |
|---|---|---|---|
| 64-70749 | 3/1989 | Japan | 250/484.4 |
| 4-101132 | 4/1992 | Japan | 378/182 |
| 8701898 | 3/1989 | Netherlands | 206/455 |

*Primary Examiner*—Carolyn E. Fields
*Assistant Examiner*—Edward J. Glick
*Attorney, Agent, or Firm*—William J. Daniel

[57]  ABSTRACT

A cassette for a photo-stimulable luminescence (PSL) radiography which comprises a flat rigid base having one surface of which a layer of PSL material is adapted to be supported, a cover for the flat base constituted of a top wall coextensive in area with the one surface of the flat base and a flange extending around the periphery of the cover top wall and projecting at an angle to the cover top wall, the peripheral flange of the wall being disposed in close-fitting relation to side edges of the base when the base and cover are assembled, and cooperating releasable detent means on the peripheral flange of the cover and the side edges of the base for securing the cover and base together, the cover being separable from the base upon release of the detent means to permit the base for radiographic exposure of the PSL layer. Preferably, the rigid base has significant thickness so that its side edges are in the form of side faces and the base side faces are inclined laterally with the side walls of the cover being correspondingly inclined in order to facilitate assembly of the cover on the base.

12 Claims, 1 Drawing Sheet

CASSETTE FOR PSL RADIOGRAPHY

This application is a continuation of application Ser. No. 08/039,993, filed Mar. 30, 1993, now abandoned.

BACKGROUND OF THE INVENTION

1. Field of the Invention

The present invention relates to radiography using PSL (photo-stimulable luminescence), and more particularly to cassettes used in such radiography.

2. Description of the Prior Art

In conventional radiography ("X-ray photography"), a plate is made by forming one or more silver halide emulsion layers on a flexible film base which is supported within a light-tight cassette. The interior of the cassette is coated with one or more X-ray sensitive luminescent layers. The cassette containing an unexposed X-ray film plate is loaded into an X-ray machine, and after exposure the cassette and exposed X-ray film plate are removed for development and fixing of the latent image produced. This is usually done automatically by feeding the cassette into a light-tight apparatus in which the cassette is opened, the exposed film plate is extracted and chemically processed and a new, unexposed film plate is loaded into the cassette which is then re-closed, the reloaded cassette and developed film plate being delivered to respective exit slots of the processing apparatus.

In the PSL system, a PSL X-ray plate has applied thereto a layer of a photostimulable luminescent material which comprises a phosphor, for example a europium-activated barium fluorohalide, and a binder. The phosphor has the characteristic that it can be energised to a metastable excited state by X-rays, and can then be stimulated by visible or infrared light to return to the ground state with the emission of visible light (of a different wavelength from the stimulating light). The excited state has a half-life of at least several hours or days in the absence of stimulating light. A PSL plate is potentially re-usable many times. The technique is described in an article by Sonoda et al. in Radiology, Volume 148 (September 1983), at pages 833 to 838, and it offers the potential advantages of better image resolution at lower X-ray dosages for the patient.

The phosphor is deposited as a layer on a flexible base which also requires enclosure in a light-tight cassette.

Current practice in PSL radiography is to pass the exposed PSL plate in its cassette to an automatic processing machine in which the PSL plate is removed from the cassette, scanned, exposed overall to light to return the PSL material to its ground state and then reloaded into a cassette for reuse. For scanning, the exposed PSL plate is transported past a laser, typically a helium-neon laser emitting at a wavelength of 633 nm, which scans line-wise across the plate in front of a light-guide comprising a bundle of optical fibers whose input ends are arranged in a line across the path of the plate close to the laser scanning line for the reception of light emitted, typically at wavelengths close to 400 nm, when the PSL material is stimulated by the laser. The light-guide is arranged to pass the emitted light to a photo-multiplier tube or other receptor. The result is a storable electronic raster image. The electronic image may be subjected to any desired computer image-enhancement techniques and it may be displayed on a video display unit, fed to a laser printer for the production of a plain paper copy, or used to control a laser arranged to expose a photographic film plate to produce an X-ray plate of conventional appearance.

The cassettes used in PSL radiography must have external dimensions which are compatible with those of conventional X-ray photography cassettes so that the PSL cassettes can be exposed in the cassette holder of a conventional X-ray machine. This is not, of course, to imply that all radiography cassettes are of the same format: they are not, they vary in format from about A5 paper size suitable for wrist X-rays to about A2 for chest X-rays and even larger. In fact, the practice has developed of depositing the phosphor layer on a conventional X-ray film base and of exposing it in a conventional X-ray photography cassette which is modified only in that it does not contain any X-ray sensitive luminescent layer.

Thus currently used PSL cassettes have not been designed with the specific purpose of PSL radiography in mind, and they suffer from a number of disadvantages which will be explained later in this specification.

DESCRIPTION OF THE INVENTION

OBJECT OF THE INVENTION

It is an object of this invention to provide a PSL cassette in which at least some of the disadvantages of currently used PSL cassettes are alleviated or avoided.

SUMMARY OF THE INVENTION

According to this invention, there is provided a cassette for photo-stimulable luminescence ("PSL") radiography, characterised in that such cassette comprises a flat rigid base plate and a cap or cover for the base plate which is releasably securable to the base plate so as to cover in light-tight fashion a layer of PSL material applied to the inside of the base plate.

A PSL cassette according to the invention offers a number of very important advantages over the use of a conventional PSL cassette which contains a separate flexible PSL plate. The flexible plate of a conventional PSL cassette will inevitably in use undergo flexure. As a result the layer of PSL material will be stressed. This will inevitably lead to breakdown of the PSL material.

In a conventional PSL cassette, it is possible to prolong the life of the PSL material by a suitable choice of binder for the phosphor and by increasing the proportion of binder in the PSL material. But if the proportion of binder is increased, the proportion of phosphor will be reduced so resolution will also be reduced. It might be possible to make some gain in resolution by making the PSL material thicker, but it will be appreciated that increasing the thickness of a PSL layer will lead to an increase in scattering which is a further cause of loss of resolution. These problems do not arise in a PSL cassette according to the invention. Because the PSL material is held on a flat and substantially rigid plate it will not be stressed by flexure. It will therefore have a longer useful service life. Also, and at least as importantly, because the layer of PSL material is not stressed in that way, it can be made thinner, and with a higher proportion of phosphor to binder, without any substantial deleterious effect on its service life, thus leading to a significant potential increase in resolution.

A PSL cassette according to the invention offers further advantages. Because a conventional PSL plate is flexible, it must be held flat after removal from its cassette for transport through a scanner and this may imply a need for both faces of such a plate to be contacted, for example, by transport rollers, by this or any other contact with the coated face of the plate will involve a risk that the PSL layer will become scratched. This disadvantage too is alleviated by the adoption of this invention. Because the PSL plate of the cassette of the invention is flat and rigid, it can readily be transported through a scanner without any contact between parts of the scanner transport system and the PSL layer. Such transport could for example be effected by rollers bearing on the edge faces of the plate. A further advantage of using a flat and rigid PSL plate is that the light-guide of the scanner apparatus can be located closer to the path of the plate while still giving a reliable clearance for the passage of the plate without any contact between the plate and the light-guide. A small, but nevertheless reliable, clearance between the plate and the light-guide promotes the efficiency and resolution with which light emitted by the PSL material is collected.

A cassette in which the PSL material is directly applied to one part of a cassette, whereby disadvantages inherent to the use of a separate flexible plate are avoided, is disclosed in EP A1 0 347 647. A cassette in accordance with this disclosure has the disadvantage that the PSL material is fitted to a flexible support whereby it is liable to stresses as hereinbefore described.

Preferably, the cap of the inventive cassette is formed with a peripheral flange which surrounds and substantially conforms to edge faces of the base plate. This helps to promote light-tightness of the cassette when the cap is on the base plate.

In the most preferred embodiments of the invention, the edge faces of the base plate at least partially slope inwardly towards the face bearing the layer of PSL material. The edge faces of the base plate may thus be partially rounded or bevelled. Such bevelling of the edge faces of the base may be relatively slight, so that they make an angle of about 100° to the coated surface instead of 90 if they were perpendicular thereto. The purpose of this rounding or bevelling is to facilitate the reunion or re-assembly of the cap and base plate altar they have been separated and the PSL coating on the base has been scanned and erased (by exposure to flooding light, e.g. from fluorescent tubes). If there is a slight misalignment of the cap and the base plate, this will be automatically corrected as the top surface of the base enters the open interior of the cap and one or other edge of the base contacts the corresponding side of the cap, with a self-centering effect. This allows the tolerances of the transport mechanisms in the scanner to be less stringent. Advantageously, the edge faces of the base plate are substantially flat. For a given angle of bevel, this increases permissible tolerances which will still allow self-centering, and it is also very simple to form the base in this way.

Preferably, edge faces of the base plate are coated with opaque flock. This helps to promote light-tightness of the cassette.

The base plate may be manufactured from any suitable material, but it is advantageously of sandwich construction comprising a pair of sheets with a cellular layer bonded between them. Such materials are already available commercially and are inexpensive. They combine low mass with a high degree of flatness and rigidity, and they are easy to machine to size and shape. The central cellular layer may for example be of a rigid polyurethane foam material while the pair of sandwiching sheets are of glass fiber reinforced plastics material. Base plates for a PSL cassette in accordance with this invention may easily be cut to size from sheets of such material. The foam layer which might otherwise be exposed at the edge faces of such base plates may be covered in flock as aforesaid, for the dual purposes of promoting light-tightness and affording a neat appearance to those edge faces.

Preferably, the cap is made of black plastic material such as polyethylene or polyvinyl chloride. Such materials are light-tight, and easily mouldable to form caps for PSL cassettes in accordance with this invention while also being tough and hard-wearing so that they can protect the layer of PSL material, without being so hard that there is a serious risk of damage to the layer of PSL material caused by pressing the cap and base plate together.

In some preferred embodiments of the invention, the top wall of the cap is lined on its exterior face with a cushion. The provision of such a cushion, which suitably comprises a layer of soft foam material faced with a thin soft plastics film, is of further assistance in avoiding damage to the PSL material, and is especially suitable for use in portable X-ray machines and in other instances where a patient may be required to lie directly on top of the cassette.

In a cassette according to the present invention, the base plate may have a peripheral heel protruding from the bottom end of the base plate in a plane parallel to that of the bottom face of the plate. Suitably, such heel protrudes over a distance such that its outer edge coincides generally with the lower edge of the peripheral flange of the cap.

Advantageously, the base plate carries a programmable erasable memory chip. Various kinds of data may be entered on such a memory chip, for example patient identification data such as name and date of birth, and data relating to the exposure used and/or to any signal processing. The use of such a memory chip, for example a so-called electrically erasable programmable read only memory (EEPROM) and its advantages are known from conventional radiography (X-ray photography), but in that case, and also in the case of previously known PSL cassettes, the memory chip has had to be incorporated in the cassette which is separable from the X-ray sensitive image recording material. The separation of the cassette cover bearing such data from the X-ray plate which takes place during processing of such known cassettes inevitably gives rise to the possibility that data relating to one patient may become associated with the X-ray plate of another patient. Incorporating the memory chip in the base plate of a cassette according to such preferred embodiments of the present invention has the further advantage that the memory chip is at no stage in the processing detached from the X-ray sensitive layer thus avoiding the possibility of confusing data in that way.

BRIEF DESCRIPTION OF THE DRAWINGS

A PSL cassette embodying the present invention will now be described, by way of example, with reference to the drawings, in which.

DETAILED DESCRIPTION OF AN EMBODIMENT OF THE INVENTION

Figure 1:
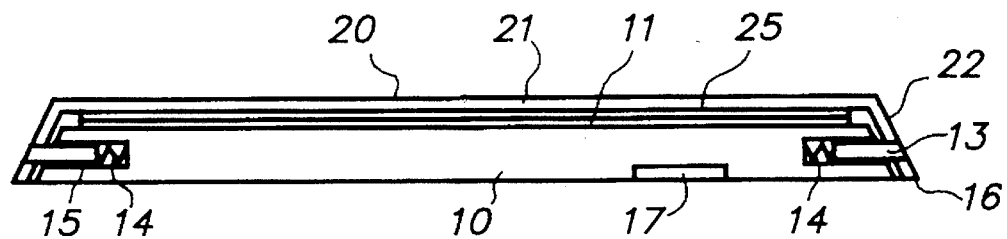
FIG. 1 is a sectional view of the base plate and cap or cover in engagement, i.e. in assembled relationship.

Referring to the drawings, the cassette consists of a base plate 10 and a cap or cover 20. The base plate 10 has a coating 11 of PSL material on its upper surface and its edge faces have a slight bevel indicated at 12. The cap 20 has a top plate 21 with a peripheral flange forming sides 22 projecting downwards from the top plate so as to fit the base 10 closely, the sides 22 having a bevel conforming to that of the edge faces of the base 10.

Latching mechanisms are located at suitable points around the edge faces of the base and cap, e.g. towards the ends of a pair of opposite edge faces. Each latching mechanism comprises a captive pin 13 and spring 14 located in a hole 15 in the edge of the base, and a matching hole 23 in the side of the cap. The pin 13 projects beyond the edge of the base by only a small distance and itself has a bevelled end, so that when the cap 20 is pressed down onto the base, the pin 13 is pressed in until the hole 23 of the cap is opposite the pin, whereupon the pin springs out again into the hole to hold the cap on the base.

The edge faces 28 of the base 10 and/or the inside surfaces of the sides 22 of the cap 20 are coated with black flock material 16 to assist in preventing light from reaching the PSL layer 11 when the base and cap are engaged. (Such light would tend to discharge the energisation of the PSL material and so degrade the stored image.) The flock material can conveniently be applied by electrostatic spraying.

The base plate 10 carries a programmable erasable memory chip 17, for example a so-called electrically erasable programmable read only memory (EEPROM). Various kinds of data may be entered on such a memory chip, for example patient identification data, such as name and date of birth, data relating to the exposure used and/or to any signal processing, and an indication of the number of times the PSL material carried by that base plate 10 has been exposed in an X-ray machine.

The cap 20 may have a ridge (not shown) formed around the border of its inside top surface, adjacent to the sides 22, to provide a slight spacing between that inside top surface and the PSL coating on the base 10. However, this inside surface of the top plate 21 is preferably lined with a cushion 25 which suitably comprises a layer of soft foam material faced with a thin soft plastics film. These measures will help to minimize wear and abrasion of the PSL layer 11.

The cap 20 is readily disengageable from the base plate 10 by pressing in the spring-loaded pins 13.

A scanner machine for scanning the present PSL cassette is described in our European application No. 92 201 110.1, entitled "Scanner for PSL radiographic cassettes", filed on Apr. 4, 1992.

Figure 2:
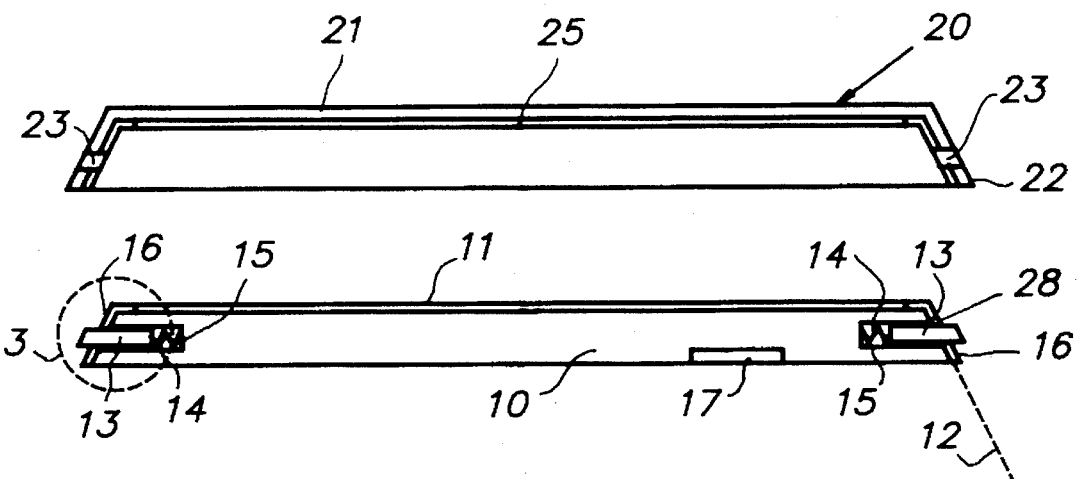
FIG. 2 is a sectional view of the base plate and cap disengaged.
Figure 3:
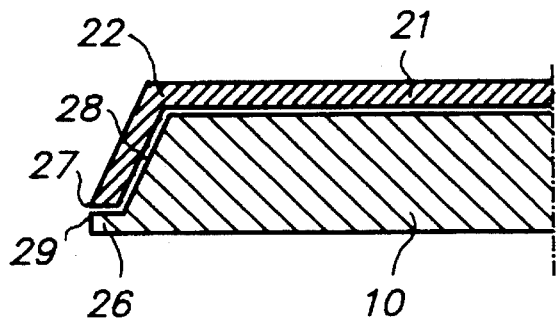
FIG. 3 is an enlarged view of a modification of a detail section designated 3 in FIG. 2.

FIG. 3 shows an improved feature of the described cassette. This figure is an enlargement of detail section 3 of FIG. 2 (the locking mechanism being omitted). The base plate 10 is provided with a peripheral heel or shoulder 26 protruding from the base and extending outwardly, its outer edge 29 coinciding practically with the outer edge 27 of the peripheral flange of the cap 21. This feature has the advantage that if the cassette is taken up by the operator from a desk or the like the operator's fingers do not pull on the lower edge of the cap but instead on the peripheral rim of the base plate. The described feature is particularly important if a plurality of cassettes are stacked onto each other, the increased mass causing an excessive loading and occasional distorsion of the slanting sides of the lowest cassette if engaged to lift the stack.

The base plate 10 and the cap may be releasably secured together in other ways than by means of the described locking pins 13 and holes 23.

For instance, patches of a fastener of the burr-and-nap type such as that widely sold under the Trade Mark Velcro may be applied respectively to the base and cap.

Alternatively, co-operating patches comprising a plurality of inter-engaging elements of a nail-like shape may be used. Such like patches are sold under the Trade Mark Dual Lock, manufactured by 3M.

We claim:

1. A cassette for photo-stimulable luminescence (PSL) radiography which comprises a substantially flat generally rigid base having on one side thereof a face on which a layer of PSL material is supported and around the periphery of said face side margins which are laterally outside of said layer of PSL material; a cover separate from said base and adapted to fit over said face of said base to cover said layer of PSL material supported on said face, said cover comprising a top plate which is generally coextensive in area with said face of said base and extends generally parallel to said base face when said cover is fitted on said base and side margins disposed in generally close-fitting relation to said side margins of the base when said cover is fitted on said base; and cooperating releasable interengaging detent elements on corresponding side margins of said cover and said base for attaching said cover to said base in covering relation to said PSL layer, the detent elements on said base being outside said PSL layer, the cover being separable from the base upon release of the detent elements to permit radiographic exposure of said PSL layer.

2. The cassette of claim 1, wherein said substantially flat base has significant thickness in a direction normal to said face supporting said PSL layer whereby said side margins of said base outside of said PSL layer comprise side faces on said base, said side faces of said base extend angularly to the plane of said face of the base supporting said layer of PSL material, said side margins of said cover extend angularly to the top plate thereof to form side walls on said cover in generally parallel relation to said base side faces when said cover is attached to said base, and said cooperating interengaging detent elements are located on the angularly extending side faces and side walls of said base and cover.

3. The cassette of claim 2, wherein said base is generally rectangular and has said side faces around the four sides thereof, each of said side faces of said flat base has a shoulder projecting laterally therefrom adjacent end edges thereof remote from said face of said base supporting said PSL layer, and said side margins of said cover have free edges terminating proximate to the shoulders.

4. The cassette of claim 3, wherein said free edges of said side walls of said cover abut against the shoulders when said cover is fitted on said base.

5. The cassette of claim 2, wherein said side faces of said flat base or interior faces of said side walls of said cover are coated with an opaque flock to aid in sealing against penetration by light when the cover is fitted on said base.

6. The cassette of claim 2, wherein said cooperating detent elements comprise spring latches yieldably supported on said side faces of said base with their ends projecting laterally exteriorly of said side faces and cooperating recesses in said cover side walls to receive the projecting ends of said spring latches.

7. The cassette of claim 2 wherein said cooperating detent elements comprise mating pads of inter-engaging elements on inner faces of said cover side walls and said side faces of said rigid base.

8. The cassette of claim 2 wherein said side faces of said base extend at a angle which is generally inclined outwardly and away from the plane of said face of said base and the side walls of said cover are substantially correspondingly inclined.

9. The cassette of claim 1, wherein said base comprises a core layer of cellular material sandwiched between opposite exterior sheets.

10. The cassette of claim 9, wherein said cover is molded from a black plastic material.

11. The cassette of claim 1, wherein said top plate of said cover has a face on a side thereof directed toward said base covered with a layer of cushioning material.

12. The cassette of claim 1, wherein said rigid base carries a programmable erasable memory chip.

* * * * *